3,625,659
PHOSPHOR RECLAMATION FROM A SLURRY
Michael J. Hammond and Raymond F. Herner, Towanda, Pa., assignors to Sylvania Electric Products Inc.
No Drawing. Filed May 28, 1970, Ser. No. 41,593
Int. Cl. B01d *21/00, 12/00;* C01f *17/00*
U.S. Cl. 23—293                                         13 Claims

ABSTRACT OF THE DISCLOSURE

Cathode luminescent phosphors can be reclaimed from a slurry by adding a predetermined amount of a soluble periodate ion source to the slurry, while agitating, and then separating the phosphor from the slurry.

BACKGROUND OF THE INVENTION

This invention pertains to cathode luminescent phosphors and more particularly to a method for reclaiming cathodoluminescent phosphors from slurries.

Color cathode ray tubes, especially those adapted for color television applications, conventionally employ at least one electron gun and a related viewing panel having a cathodoluminescent screen responsive to electron impingement disposed upon a surface thereof. Such a screen is generally comprised of a plurality of discretely patterned cathodoluminescent phosphor groups consisting of bars, stripes, or dots of specific fluorescent materials, which, in response to electron beam excitation, produce the primary colors of green, blue, and red, respectively.

In the art of manufacturing color cathode ray tubes, a cathodoluminescent screen of the above described type can be fabricated by one or several well-known methods for applying color phosphors to the surface of the viewing panel. For example, one of these screening methods which has been found to be highly advantageous concerns a wet or slurry technique wherein a respective phosphor is mixed with a binder, such as polyvinyl alcohol and a sensitizing agent in the form of a dichromate ion furnishing compound and disposed in a liquid slurry coating on the panel. Subsequently, the phosphor-coated screen area is exposed through a negative to actinic radiation and then developed by steps well understood in the art.

After the preparation of the slurry, however, it is sometimes found that the slurry cannot be used to make cathodoluminescent screens. Since certain of the phosphors, especially the rare-earth varieties, are expensive materials, considerable monetary value is manifest in the loss of such phosphors. Because of the stability and high viscosity of the slurry, filtering, as a means of reclaiming, is uneconomical on a large scale. Additions of a strong mineral acid reduces the viscosity of the slurry, but generally the phosphors suffer severe brightness losses or decompose.

It is believed therefore, that a method which readily reduces the viscosity of the slurry and allows rapid filtration of the slurry to reclaim the phosphor without adversely affecting the phosphor, is an advancement in the art.

SUMMARY OF THE INVENTION

In accordance with one aspect of this invention, there is provided a method of reclaiming cathodoluminescent phosphor from a slurry. The method comprises adding a soluble periodate ion source to a slurry consisting essentially of a cathodoluminescent phosphor, water, polyvinyl alcohol, and a dichromate ion furnishing compound, in a sufficient amount to appreciably lower the viscosity of the slurry. The slurry is agitated for a sufficient amount of time to enable the soluble periodate ion source to be uniformly dispersed throughout the slurry before separating the cathodoluminescent phosphor from the slurry.

DESCRIPTION OF THE PREFERRED EMBODIMENT

For a better understanding of the present invention, together with other and further objects, advantages, and capabilities thereof, reference is made to the following disclosure and appended claims in connection with the above description of one of the aspects of the invention.

Referring now to the invention with greater particularity, the method for reclaiming the cathodoluminescent phosphor from the slurry is to reduce the viscosity of the slurry, and in particular, the polyvinyl alcohol. Surprisingly, it has been found that this can be accomplished by adding to the slurry from about 0.01% to 0.05%, by weight, of a soluble periodate ion source, based on the total weight of the slurry, and agitating the slurry for at least about 1 minute to enable the soluble periodate ion source to be uniformly dispersed throughout the slurry. The cathodoluminescent phosphor can then be readily separated from the slurry. The addition of the soluble periodate source reduces the viscosity of the slurry from about 60 centipoises (cps.) to less than about 40 cps. By adjusting the pH of the slurry, the viscosity can be further reduced to below about 15 cps.

When less than about 0.01 weight percent periodate ion source is used, the viscosity of the slurry is not sufficiently reduced to permit readily separating the desired cathodoluminescent phosphor from the slurry. Using greater than about 0.05 weight percent soluble periodate ion source is uneconomical and can affect the brightness and particle size of the phosphor.

By soluble periodate ion source is meant one which is soluble in the slurry media, to the extent of at least about 0.1 g./cc. slurry; for example, in a slurry comprising about 28% cathodoluminescent phosphor, about 3.5% polyvinyl alcohol, about 0.5% dichromate ion furnishing compound, and about 68% water. Preferred sources of a periodate ion are normal alkali periodates, normal alkaline-earth periodates, and periodic acid. Of these, potassium periodate is especially preferred.

Agitation is generally provided with conventional agitators used to provide agitation to solutions having the viscosity of from about 1 cps. to about 75 cps. The degree of agitation need only to be sufficient to achieve good distribution of the components of the solution. The type of agitation and degree of agitation will be dependent upon the type of vessel used, availability of equipment, and other factors that will be obvious to those familiar with chemical processing equipment design.

The slurry is generally agitated from about 1 minute to about 10 minutes. Agitation times, shorter than about 1 minute, do not always permit uniform dispersion of the soluble periodate ion source in the slurry; and agitation times longer than about 10 minutes is usually not necessary.

It has also been found to be beneficial to adjust the pH of the slurry from about 4 to about 7 with an acid, such as sulfuric acid, hydrochloric acid, or acetic acid prior to the addition of the soluble periodic ion source. Having the pH of the slurry at from about 4 to about 7 appears to enhance the reaction and further reduce the viscosity of the slurry. An alternative procedure is to adjust the pH of the slurry from about 4 to about 7 after the soluble periodate source is added to the slurry. In either case, the pH of the slurry should then be readjusted to about 9 with a basic solution to avoid the detrimental effect of brightness loss which acid can have on the cathodoluminescent phosphor. Ammonium hydroxide is a preferred basic solution for pH adjustment.

This method of cathodoluminescent phosphor reclaim from slurries has been found to be effective for phosphors having an anion selected from the group consisting of oxides, oxysulfide, and sulfides and having a cation selected from the group consisting of rare earths, zinc, and cadmium. Yttrium, for the purpose of this disclosure, is to be considered a rare earth. Yttrium oxide, Yttrium gadolinium oxide, and zinc cadmium sulfide host phosphors are particularly well suited for phosphor reclaim utilizing this method.

The cathodoluminescent phosphor can then be readily separated from the slurry by conventional means, such as filtering, centrifuging, decanting and the like. A small amount of water, from about 10% to about 20% by weight, based on the volume of the slurry, can be added to the slurry prior to separating the phosphor from the slurry to further reduce the viscosity. Care should be taken so as not to dilute the phosphor concentration to the extent that reclaiming the phosphor would be uneconomical. The addition of water to the slurry before separating is meant only as a separating aid and is not necessary for the operation of this invention.

The following examples are submitted to illustrate and not to limit the invention. All parts, proportions, and percentages are by weight, unless otherwise given.

Example 1

To about 200 ml. of 60 cps. slurry containing about 66 parts yttrium oxide host phosphor and 2 parts polyvinyl alcohol, about .050 part potassium periodate is added. The viscosity of the slurry is reduced to 38 cps. The slurry is then adjusted to about pH 4 with sulfuric acid and the viscosity is reduced to 12 cps. The pH of the slurry is readjusted to about pH 9 with ammonium hydroxide, with no viscosity change. The slurry is filtered and the yttrium oxide host phosphor is recovered. Subsequent tests for brightness reveal no appreciable loss.

Example 2

To about 150 ml. of 60 cps. slurry containing about 50 parts yttrium gadolinium oxide host phosphor and about 2 parts polyvinyl alcohol, .020 part potassium periodate is added. The viscosity of the slurry is adjusted to about pH 4 with hydrochloric acid, and the viscosity is reduced to 12 cps. The pH of the slurry is readjusted to about pH 9 with ammonium hydroxide, with no viscosity change. About 15 ml. of water is added to the slurry, further reducing the viscosity to about 5 cps. The slurry is filtered and the yttrium gadolinium oxide host phosphor is recovered. Subsequent tests for brightness reveal no appreciable loss.

Example 3

The pH of about 200 ml. of 60 cps. slurry, containing about 66 parts gadolinium oxide host phosphor and about 2 parts polyvinyl alcohol is adjusted to about pH 4 with sulfuric acid. About .050 part sodium periodate is added and the viscosity is reduced to about 12 cps. The slurry is then readjusted to pH 9 with ammonium hydroxide, filtered, and the phosphor recovered. Subsequent tests for brightness reveal no appreciable loss.

Example 4

To about 200 ml. of 60 cps. slurry containing about 66 parts yttrium oxide host phosphor and about 2 parts polyvinyl alcohol, about 0.050 part potassium periodate is added. The viscosity of the slurry is reduced to about 38 cps. About 15 ml. of water is added to the slurry, further reducing the viscosity to about 25 cps. The slurry is filtered and the phosphor recovered. Subsequent tests for brightness reveal no appreciable loss.

While there has been shown and described what are at present considered the preferred embodiments of the invention, it will be obvious to those skilled in the art that various changes and modifications may be made therein without departing from the scope of the invention as defined by the appended claims.

We claim:

1. In the manufacture of cathode ray screens by the direct slurry method, wherein the slurry consists essentially of a cathodoluminescent phosphor, water, polyvinyl alcohol, and a dichromate ion furnishing compound, said cathodoluminescent phosphor having an anion selected from the group consisting of oxides, oxysulfides, and sulfides, and having a cation selected from the group consisting of rare earths, zinc and cadinium, the method of recovering said cathodoluminescent phosphor from said slurry comprising the steps of:

(a) adding a soluble periodate ion source which is soluble to the extent of at least about 0.1 g./cc. in a slurry comprising about 28% cathodoluminescent phosphor, about 3.5% polyvinyl alcohol, about 0.5% dichromate ion furnishing compound, and about 68% water, to said slurry, in a sufficient amount of at least about 0.01% by weight, with respect to the weight of said slurry, to appreciably lower the viscosity of said slurry, and agitating for a sufficient period of time of at least about one minute to enable said soluble periodate ion source to be uniformly dispersed throughout said slurry, and (b) thereafter separating said cathodoluminescent phosphor from said slurry.

2. A method according to claim 1, wherein said amount of said soluble periodate ion source is from about 0.01% to about 0.05%, by weight, with respect to the weight of said slurry.

3. A method according to claim 1, wherein said period of time is from about 1 minute to about 10 minutes.

4. A method according to claim 1, wherein the pH of the slurry is adjusted from about 4 to about 7 with an acid prior to the addition of said periodate ion source and thereafter adjusted to a pH of about 9 with a basic solution after the addition of said periodate ion source.

5. A method according to claim 1, wherein the pH of the slurry is adjusted from about 4 to about 7 with an acid after the addition of said periodate ion source and thereafter adjusted to a pH of about 9 with a basic solution.

6. A method according to claim 1, wherein said cathodoluminescent phosphor is yttrium oxide.

7. A method according to claim 1, wherein said cathodoluminescent phosphor is gadolinium oxide.

8. A method according to claim 1, wherein said cathodoluminescent phosphor is yttrium gadolinium oxide.

9. A method according to claim 1, wherein said cathodoluminescent phosphor is zinc cadmium sulfide.

10. A method according to claim 5, wherein said acid is sulfuric acid.

11. A method according to claim 5, wherein said basic solution is ammonium hydroxide.

12. A method according to claim 5, wherein said soluble periodate ion source is selected from the group consisting of alkali periodates, alkaline earth periodates and periodic acid.

13. A method according to claim 12, wherein said soluble periodate source is potassium periodate.

References Cited

UNITED STATES PATENTS

| | | | |
|---|---|---|---|
| 3,348,924 | 10/1967 | Levine | 23—312 ME |
| 3,437,432 | 4/1969 | Borchardt | 252—301.4 |
| 3,420,860 | 1/1969 | Ropp | 252—301.4 |
| 3,441,512 | 4/1969 | Durkee | 252—301.4 |
| 3,447,682 | 6/1969 | Hedler | 209—167 |
| 3,449,258 | 6/1969 | Ropp | 252—301.4 |
| 3,474,040 | 10/1969 | Hedler | 23—312 ME |
| 3,484,381 | 12/1969 | Yale | 252—301.4 |
| 3,506,585 | 3/1970 | Otsuka | 23—300 |
| 3,523,904 | 8/1970 | Single | 252—301.4 |
| 3,442,802 | 5/1969 | Hamilton | 210—63 |

OTHER REFERENCES 3,442,798, May 6, 1969, Schoeffel (U.S. patent).

NORMAN YUDKOFF, Primary Examiner

S. J. EMERY, Assistant Examiner

U.S. Cl. X.R.

23—19, 23, 134, 135; 210—63; 252—301.4, 301.6